US008056086B2

(12) United States Patent
El-Mahdy et al.

(10) Patent No.: US 8,056,086 B2
(45) Date of Patent: Nov. 8, 2011

(54) LOAD BALANCING FOR IMAGE PROCESSING USING MULTIPLE PROCESSORS

(75) Inventors: Ahmed Hazem Mohamed Rashid El-Mahdy, Alexandria (EG); Hisham ElShishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 12/122,827

(22) Filed: May 19, 2008

(65) Prior Publication Data

US 2009/0288096 A1  Nov. 19, 2009

(51) Int. Cl.
G06F 9/46 (2006.01)
(52) U.S. Cl. ........................................ 718/105
(58) Field of Classification Search .................. None
See application file for complete search history.

(56) References Cited

U.S. PATENT DOCUMENTS

| | | | | |
|---|---|---|---|---|
| 4,631,690 | A * | 12/1986 | Corthout et al. | 345/420 |
| 4,736,201 | A * | 4/1988 | Nakayama et al. | 345/442 |
| 5,293,480 | A * | 3/1994 | Miller et al. | 345/502 |
| 5,363,475 | A * | 11/1994 | Baker et al. | 345/422 |
| 5,493,643 | A * | 2/1996 | Soderberg et al. | 345/505 |
| 5,709,209 | A * | 1/1998 | Friemel et al. | 600/447 |
| 5,757,385 | A * | 5/1998 | Narayanaswami et al. | 345/505 |
| 5,794,016 | A * | 8/1998 | Kelleher | 345/505 |
| 5,963,211 | A * | 10/1999 | Oikawa et al. | 345/424 |
| 6,285,348 | B1 * | 9/2001 | Lewis | 345/614 |
| 6,473,066 | B1 * | 10/2002 | Okuzono | 345/87 |
| 7,106,895 | B1 | 9/2006 | Goldberg et al. | |
| 2002/0050959 | A1* | 5/2002 | Buckelew et al. | 345/55 |
| 2002/0113787 | A1* | 8/2002 | Ray et al. | 345/424 |
| 2004/0196296 | A1* | 10/2004 | Lewis | 345/611 |
| 2004/0217974 | A1* | 11/2004 | Lewis | 345/611 |
| 2006/0221087 | A1 | 10/2006 | Diard | |

OTHER PUBLICATIONS

Squyres et al.; A toolkit for parallel image processing; 12 pages.
Ravikumar et al.; SHARP: a shape recognition system and its parallel implementation; 8 pages.

* cited by examiner

*Primary Examiner* — Idriss N Alrobaye
(74) *Attorney, Agent, or Firm* — Schmeiser, Olsen & Watts; Joseph Bracken

(57) ABSTRACT

A method and system for load balancing the work of NP processors (NP≧3) configured to generate each image of multiple images in a display area of a display device. The process for each image includes: dividing the display area logically into NP initial segments ordered along an axis of the display area; assigning each processor to a corresponding initial segment; assigning a thickness to each initial segment; simultaneously computing an average work function per pixel for each initial segment; generating a cumulative work function from the average work function per pixel for each initial segment; partitioning a work function domain of the cumulative work function into NP sub-domains; determining NP final segments of the display area by using the cumulative work function to inversely map boundaries of the sub-domains onto the axis; assigning each processor to a final segment, and displaying and/or storing the NP final segments.

25 Claims, 13 Drawing Sheets

LOAD BALANCING FOR IMAGE PROCESSING USING MULTIPLE PROCESSORS

FIELD OF THE INVENTION

The present invention relates to load balancing the work of multiple processors to generate an image in a display area of a display device.

BACKGROUND OF THE INVENTION

On Chip-Multiprocessing is main stream architecture for computers. The number of cores per chip is increasing, scaling up the performance of applications. However, to utilize the increasing number of cores, the application's work needs to be load balanced as evenly and as quickly as possible on the cores. As the number of cores increases, the importance of load-balancing likewise increases.

However, current load balancing of multiple processors for image processing is inefficient. Thus, there is a need for improved efficiency in load balancing of multiple processors for image processing.

SUMMARY OF THE INVENTION

The present invention provides a method for load balancing the work of NP processors (NP≧3) configured to generate each image of N images (N≧1) in a display area of a display device, said method comprising performing a process for each image, said process for each image comprising:

dividing the display area into NP initial segments ordered along an axis of the display area;

assigning each processor to a corresponding initial segment, each processor configured to generate a portion of each image only in the initial segment to which each processor is assigned;

assigning a thickness to each initial segment;

simultaneously computing an average work function per pixel for each initial segment;

generating a cumulative work function by cumulatively integrating the average work function per pixel over the initial segments;

partitioning a work function domain of the cumulative work function into NP sub-domains;

determining NP final segments of the display area by using the cumulative work function to inversely map boundaries of the sub-domains onto the axis;

assigning each processor to a final segment such that the processors are in a same ordering along the axis as were the processors assigned to the initial segments, and displaying and/or storing the NP final segments.

The present invention provides a computer program product, comprising a computer usable storage medium having a computer readable program code stored therein, said computer readable program code containing instructions that when executed by a processing unit of a computer system implement a method for load balancing the work of NP processors (NP≧3) configured to generate each image of N images (N≧1) in a display area of a display device, said method comprising performing a process for each image, said process for each image comprising:

dividing the display area into NP initial segments ordered along an axis of the display area;

assigning each processor to a corresponding initial segment, each processor configured to generate a portion of each image only in the initial segment to which each processor is assigned;

assigning a thickness to each initial segment;

simultaneously computing an average work function per pixel for each initial segment;

generating a cumulative work function by cumulatively integrating the average work function per pixel over the initial segments;

partitioning a work function domain of the cumulative work function into NP sub-domains;

determining NP final segments of the display area by using the cumulative work function to inversely map boundaries of the sub-domains onto the axis;

assigning each processor to a final segment such that the processors are in a same ordering along the axis as were the processors assigned to the initial segments, and displaying and/or storing the NP final segments.

The present invention provides a computer system comprising a processing unit and a computer readable memory unit coupled to the processing unit, said memory unit containing instructions that when executed by the processing unit implement a method for load balancing the work of NP processors (NP≧3) configured to generate each image of N images (N≧1) in a display area of a display device, said method comprising performing a process for each image, said process for each image comprising:

dividing the display area into NP initial segments ordered along an axis of the display area;

assigning each processor to a corresponding initial segment, each processor configured to generate a portion of each image only in the initial segment to which each processor is assigned;

assigning a thickness to each initial segment;

simultaneously computing an average work function per pixel for each initial segment;

generating a cumulative work function by cumulatively integrating the average work function per pixel over the initial segments;

partitioning a work function domain of the cumulative work function into NP sub-domains;

determining NP final segments of the display area by using the cumulative work function to inversely map boundaries of the sub-domains onto the axis;

assigning each processor to a final segment such that the processors are in a same ordering along the axis as were the processors assigned to the initial segments, and displaying and/or storing the NP final segments.

The present invention provides improved efficiency in load balancing of multiple processors for image processing.

DETAILED DESCRIPTION OF THE INVENTION

The present invention provides efficient load-balancing for a wide range of variable work per pixel processing applications. Such applications have a fixed number of independent fine grained work units whose execution times are variable and not known until run time, because the amount of processing work per pixel varies with the characteristics of current and possibly neighbouring pixels. Applications such as advanced tone mapping techniques and fractal generation fall into this class of applications.

Figure 1:
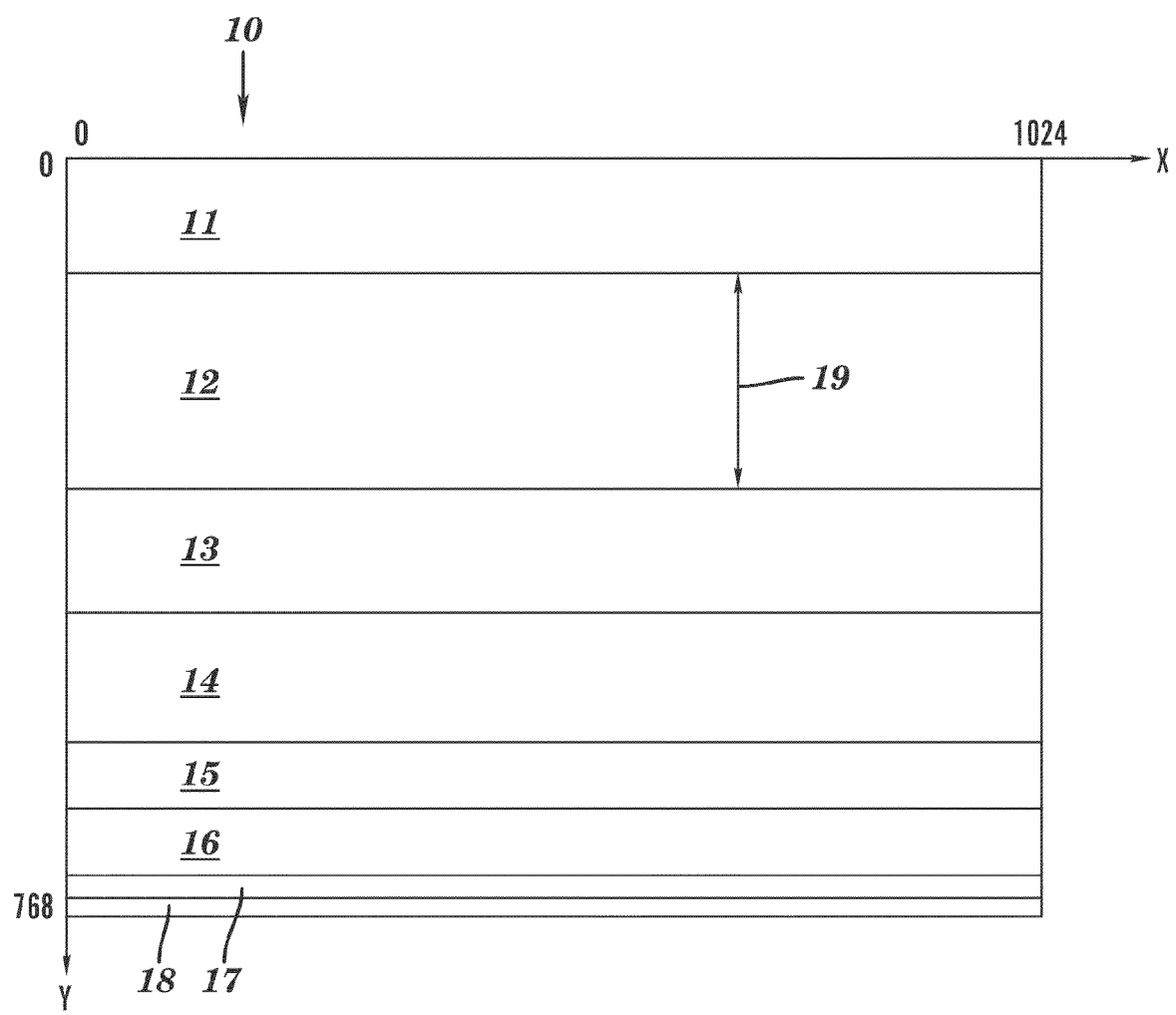
FIG. 1 depicts a two-dimensional display area of a display device in which an image is to be generated, in accordance with embodiments of the present invention.

FIG. 1 depicts a two-dimensional display area 10 of a display device in which an image is to be generated (i.e., rendered), in accordance with embodiments of the present invention. The display device may be a component of a computer system in which the methods of the present invention are performed, such as the computer system 90 in FIG. 13 (described infra). In one embodiment, the display device is external to a computer system in which the methods of the present invention are performed. In one embodiment, the display device is not coupled to a computer system in which the methods of the present invention are performed.

The display area 10 is represented in a two-dimensional rectangular coordinate system having an X axis and a Y axis, respectively denoting X and Y directions. The display area 10 has NX pixels in the X direction and NY pixels in the Y directions. In one embodiment NX=1024 and NY=768 as indicated in FIG. 1 for illustrative purposes only. Generally, NX and NY are each a positive integer of at least 3. In one embodiment, NX=NY. In one embodiment, NX≠NY.

The present invention performs pre-processing steps (i.e., steps prior to full image generation in full resolution) to configure an efficient load balancing for executing multiple processors simultaneously (i.e., concurrently) to generate an image in the display area 10. The pre-processing steps divide the display area 10 into segments 11-18 ordered in the Y direction. Each segment comprises one or more rows of pixels. The processing operations are capable of being performed independently on all pixels. Each processor is assigned to a segment and is dedicated to its segment.

The thickness 19 of a segment is defined as the number of rows in the segment (or the number of columns if the segments are ordered in the Y direction). The thicknesses 19 of the multiple segments are determined by the present invention to constrain a measure of the execution time to be about a same execution time for generating a portion of the image in each segment.

In FIG. 1, the segments 11-18 are ordered in the Y direction such that the thickness 19 of each segment is defined in the Y direction. Each segment corresponds to a range of pixels along the Y axis. Although the formalism and accompanying examples presented herein are for segments ordered in the Y direction and having a thickness in the Y direction, the scope of the present invention includes columns ordered in the X direction with corresponding thicknesses in the X direction.

It is noted that the X and Y directions are effectively interchanged if the image 10 in FIG. 1 is rotated by 90 degrees and the rows and columns are likewise interchanged. Thus the present invention applies to either segments consisting of rows ordered in the Y direction or segments consisting of columns ordered in the X direction. Although the present invention is depicted in the Figures and described herein (for the reader's convenience) in terms of segments consisting of rows ordered in the Y direction, it should be understood that the present invention may alternatively include segments consisting of columns ordered in the X direction.

In one embodiment, a high degree of skew in NX verses NY may be taken into account in determining whether to stack in segments in the Y direction or in the X direction. Specifically, if NY/NX is less than a specified Y/X pixel ratio, then the segments are ordered in the X direction, and vice versa. For example, if NY=128 and NX=1024 and the specified Y/X pixel ratio is 0.20 then the segments are ordered in the X direction in this embodiment, because NY/NX 128/1024=0.125 which is less than the specified Y/X pixel ratio of 0.20.

In one embodiment, if NY<NP and NX≧NP (wherein NP is the total number of processors), then the segments are ordered in the X direction.

In one embodiment, if NX<NP and NY≧NP, then the segments are ordered in the Y direction.

The number of segments is equal to the number of processors (NP) which will be executed to generate the image in the display area 10, wherein NP≧3. Processor P(m) is used to generate the image portion of the image only in segment m for m=1, 2, . . . , NP. The NP processors are configured to be executed simultaneously to generate the image portion in each processor's assigned segment, which results in generation of the full image in the display area 10.

A work function w(m) for segment m is defined as a measure of execution time for processor P(m) to generate the image portion in segment m for m=1, 2, . . . , NP. Non-limiting examples of a measure of execution time for the present invention include: the execution time, the number of execution cycles, the number of processing steps, etc., for processor P(m) to execute the image portion in segment m for m=1, 2, . . . , NP.

A cumulative work function W(y) for segments y (y=1, 2, ..., NP) is defined by the following equation:

$$W(y) = \sum_{i \leq y} w(i)$$

wherein i denotes a dummy segment index in the above equation. Note that the cumulative work function W(y) is positive and is a monotonically increasing function of y.

Figure 2:
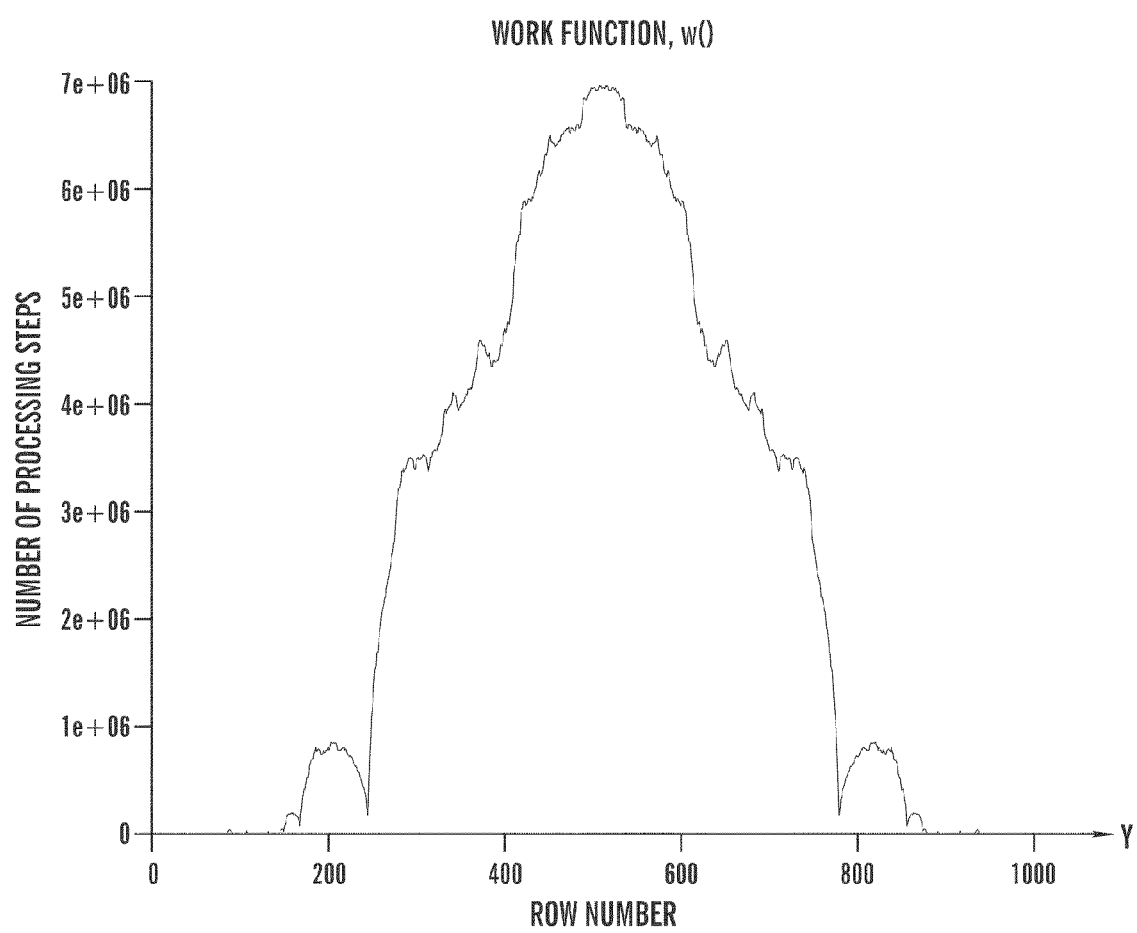
FIG. 2 is a plot of an illustrative work function versus row number, in accordance with embodiments of the present invention.

FIG. 2 is a plot of an illustrative work function versus row number, in accordance with embodiments of the present invention.

Figure 3:
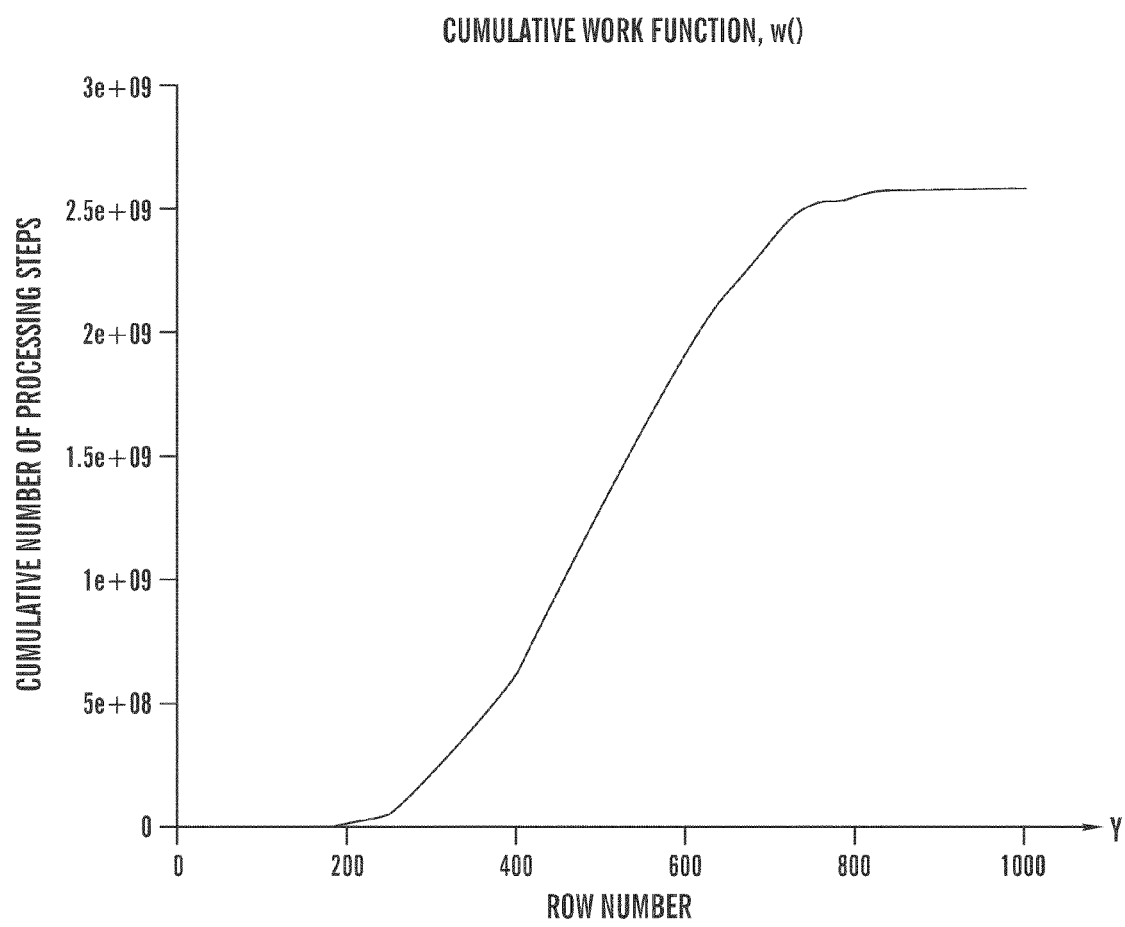
FIG. 3 is a plot of an illustrative cumulative work function versus row number, in accordance with embodiments of the present invention.

FIG. 3 is a plot of an illustrative cumulative work function versus row number, in accordance with embodiments of the present invention.

Figure 4:
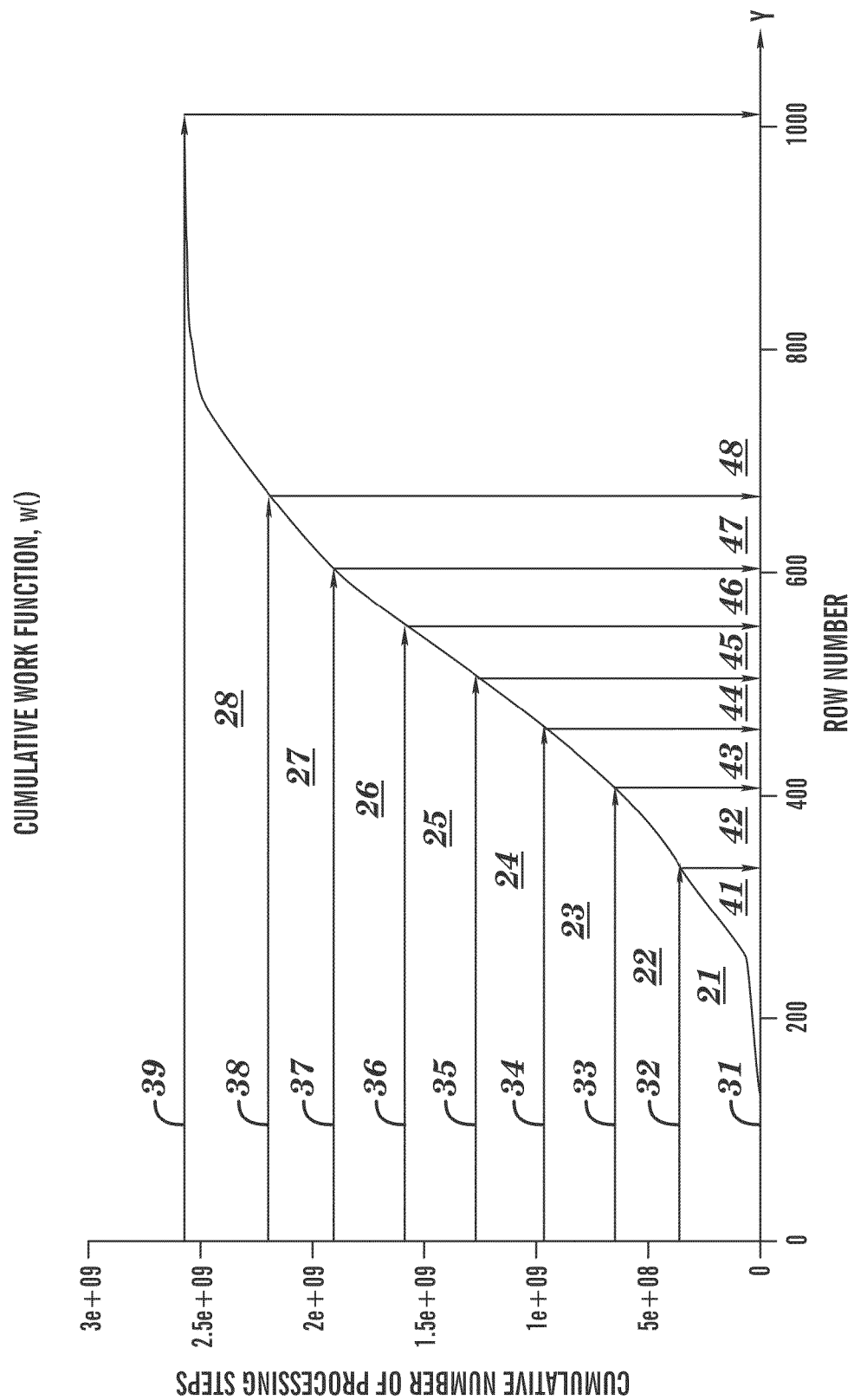
FIG. 4 is a plot of an illustrative a cumulative work function whose domain is divided into equally sized portions, in accordance with embodiments of the present invention.

FIG. 4 depicts a cumulative work function W(y) whose domain is divided into equal-sized sub-domains of W(y), in accordance with embodiments of the present invention. In particular, FIG. 4 depicts eight equal-sized sub-domains 21-28 of W(y) as defined by sub-domain boundaries 31-39. The sub-domain boundaries 31-39 are inverse mapped by W(y) onto the Y axis to obtain Y-axis final segments 41-48 respectively corresponding the sub-domains 21-28. Mathematically, if $W_m$ (m=1, 2, ..., 9) denotes a sub-domain boundary of W(y) in FIG. 4, then the corresponding final segment boundary $Y_m$ along the Y axis is obtained by mapping the inverse of W(y) at $W=W_m$ onto the Y axis.

Ideally, a processor would be assigned to each such Y-axis segment in FIG. 4 and the processors would be executed simultaneously to generate the image for display area 10. However, obtaining the cumulative work function W(y) would require generating the entire image in its complete resolution, which would defeat the purpose of generating the cumulative work function W(y).

To overcome the preceding problem of generating the cumulative segment work function W(y) in its entirety as discussed supra in conjunction with FIG. 4, the present invention introduces pre-processing steps utilizing an accurate and fast random sampling technique, combined with curve fitting, to approximate the cumulative work function so as to generate a useful load balancing configuration for generating the image in the display area 10. The execution time for the additional processing overhead of random sampling and associated processing prior to generating the image in the display area 10 is less than a reduction in processing time resulting from the load balancing as compared with generating the image without the load balancing as will be demonstrated in conjunction with Tables 1 and 2 as discussed infra.

The quantity of work Q(m) required to generate the image portion in the pixels of segment m is estimated by computing a product of the number of pixels (NPIX(m)) in segment m and the average work function per pixel in segment m ($w_{ave}$(m)), wherein NPIX(m) NX*T(m), and wherein the thickness T(m) of segment m is equal to the number of rows in segment m. If alternatively the segments are ordered in the X direction, then NPIX(m)=NY*T(m)), wherein the thickness T(m) of segment m is equal to the number of columns in segment m. Therefore, Q(m) is proportional T(m)*$w_{ave}$(m) since NX and NY are constant. The present invention estimates a value of $w_{ave}$(m) by random sampling and adjusts T(m) so as to constrain T(m)*$w_{ave}$(m) to be about the same value for all segments m (i.e., for m=1, 2, ..., NP).

Figure 5:
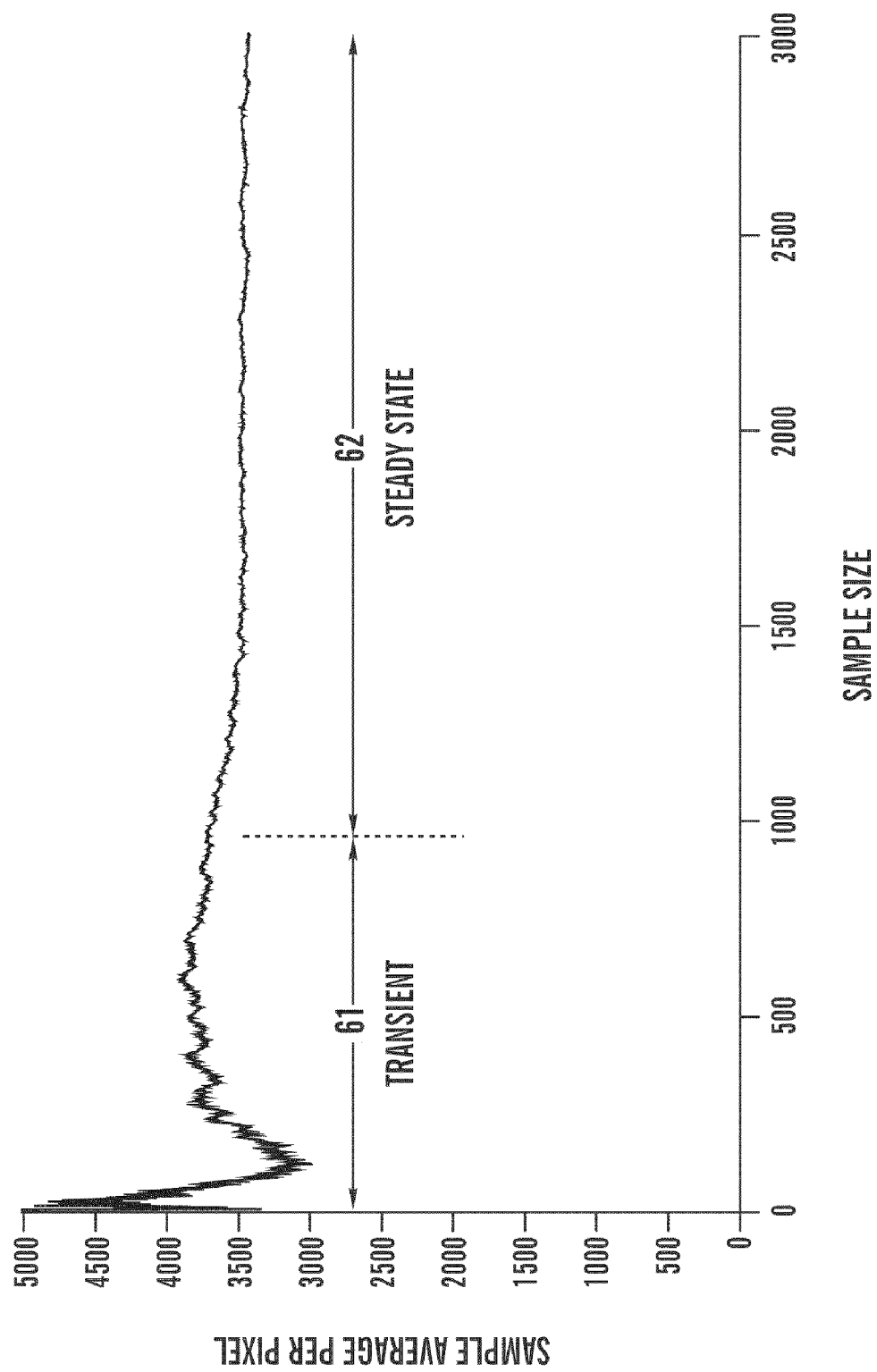
FIG. 5 is an exemplary plot of a sample average work function per pixel as a function of sample size for a segment, in accordance with embodiments of the present invention.

FIG. 5 is an exemplary plot of a sample average work function per pixel $w_{ave}$(m) in segment m as a function of sample size (i.e., number of sampled pixels in segment m), in accordance with embodiments of the present invention. An average work function per pixel for a segment is defined as the work function for the segment divided by the number of pixels in the segment. The segment m in FIG. 5 is a 128×1024 segment (approximately 128,000 pixels) in a 'fractal generation' application. FIG. 5 depicts a transient region 51 followed by a stable steady state region 52. The average work function $w_{ave}$(m) for segment m depicted in FIG. 5 is estimated by randomly sampling the pixels in segment m.

For the random sampling procedure, the display area 10 is initially divided into initial segments, each initial segment having an assigned thickness (i.e., number of included rows or columns). Each initial segment m is assigned a processor P(m) having a processor speed S(m) for m=1, 2, ..., NP, and all initial segments are sampled simultaneously with respect to each initial segment's pixels through use of each initial segment's processor. The thickness T(m) of initial segment m (in the Y direction) may be about constant (i.e., approximately initial-segment independent) or may be variable (i.e., not about constant and segment dependent). The thickness of an initial segment is the total number of rows (or columns if the segments are ordered in the X direction) in the initial segment. "About constant" means that each initial segment's thickness cannot differ by more than 1 row (or 1 column if the segments are ordered in the X direction) from any other initial segment's thickness.

For example, if the total number of rows (NY) is 768 and the number of initial segments (NP) is 16 (which is equal to the number of processors), then a constant initial segment thickness of 48 rows (i.e., 768/16) may be used for each initial segment.

As another example, if the total number of rows (NY) is 768 and the number of initial segments (NP) is 9, then a constant initial segment thickness is impossible because 768 modulus 9 is not zero. However, an initial segment thickness of 85 for each of 6 processors and an initial segment thickness of 86 for each of 3 processors in this example is an "about constant" initial segment thickness of 85 to 86 rows, since each segment's initial thickness does not differ by more than 1 row from any other segment's initial thickness.

As yet another example, if the total number of rows (NY) is 768 and the number of initial segments (NP) is 9, then an initial segment thickness of 85 for each of 7 processors, an initial segment thickness of 86 for 1 processor, and an segment thickness of 87 for 1 processor is a variable initial segment thickness ranging from 85 to 87 rows in this example, because 87 minus 85 is 2, in violation of the "about constant" thickness requirement of each segment's initial thickness not differing by more than 1 row from any other segment's initial thickness.

In one embodiment, processor speed S(m) is constant over the processors P(m) (i.e., S(m) is a same processor speed for m=1, 2, ..., NP) and an about constant initial segment thickness (i.e., about a same initial segment thickness) is used for the random sampling procedure. However in one embodiment, a variable initial segment thickness may be used for the random sampling procedure even if the processor speed is constant over the processors.

In one embodiment, processor speed is variable over the processors (i.e., at least two processors have a different processor speed) and a variable initial segment thickness is used for the random sampling procedure such that T(m) is inversely proportional (or about inversely proportional) to the processor speed S(m); i.e., T(m) varies as 1/S(m) (or about as 1/S(m)). For example, if the total number of rows is 1400, the number of initial segments (NP) (and the number NP of processors as well) is 4, and the processors have relative processing speeds S(m) of 2, 3, 6, 6, then the inverse proportionality of T(m) with respect to S(m) determines relative initial segment thicknesses of 3, 2, 1, 1. Since the total number of rows is 1400, the actual layer thicknesses are: T(1)=1400*(³⁄₇)=600, T(2)=1400*(²⁄₇)=400, T(3)=1400*(¹⁄₇)=200, T(4)=1400*(¹⁄₇)=200.

Note that the special case of constant processor speed and accompanying about constant layer thickness is consistent with T(m) varying as 1/S(m). However in one embodiment, the layer thicknesses T(m) is not consistent with T(m) varying as 1/S(m). For example, if the processor speed is variable, any initial segment thickness profile may be used (including an about constant initial segment thickness profile).

Once the processors have been assigned to the initial segments and the initial segment thicknesses have been determined, the NP initial segments are sampled simultaneously by the respective processors to estimate an average work function per pixel in each initial segment m ($w_{ave}(m)$) for m=1, 2, . . . , NP. The sampling of pixels in a given initial segment is described in conjunction with FIG. 6.

Figure 6:
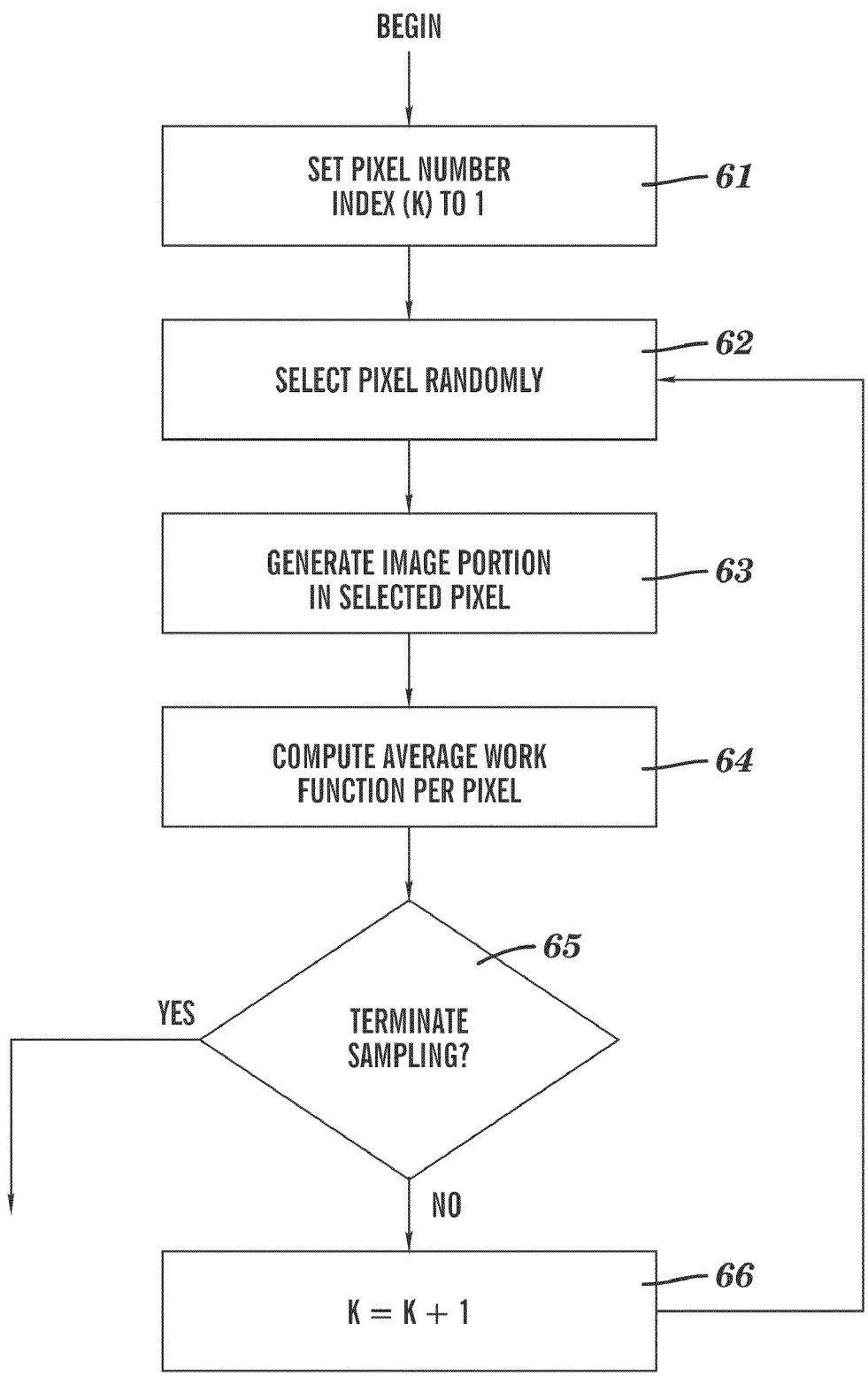
FIG. 6 is a flow chart describing a random sampling algorithm for computing an average work function per pixel to display a portion of an image in a segment of a display area, in accordance with embodiments of the present invention.

FIG. 6 is a flow chart describing a random sampling algorithm for estimating an average work function per pixel to display a portion of an image in each initial segment of a display area, in accordance with embodiments of the present invention. Each initial segment m includes one or more rows (or columns if the segments are ordered in the X direction) assigned a processor P(m) having a processor speed S(m) such that the processor P(m) will randomly sample only initial segment m for implementing the algorithm of FIG. 6, for m=1, 2, . . . , NP. The NP initial segments are sampled simultaneously and FIG. 6 describes the random sampling of one segment of the NP segments. The flow chart of FIG. 6 comprises steps 61-66

Step 61 sets a pixel number index (K) to 1.

Step 62 selects a next pixel (i.e., pixel K) in the initial segment randomly, using any applicable probability density function (PDF). The randomly selected pixel k is in any row (or in any column if the segments are ordered in the X direction) of the initial segment. In one embodiment, the PDF is uniform (i.e., constant) such that each pixel in the initial segment has a same probability of being selected, which reflects a lack of knowledge as to how the work function is spatially distributed in the initial segment. If there is preexisting knowledge of one or more characteristics of the spatial distribution of the work function in the initial segment, then the PDF may be structured in a manner that reflects this knowledge to reduce the statistical variance of the random sampling process.

Step 63 generates an image portion of the image in pixel K and a corresponding pixel work function measure ($F_K$) for the image portion generated in pixel K, wherein $F_K$ represent the execution time or a measure thereof (e.g., the number of execution cycles, the number of processing steps, etc.) and may be recorded in a storage medium for subsequent usage.

Step 64 computes the average work function per pixel $F_{AVE,K}$ for the sample of K pixels, which is defined as the arithmetic average of $F_1, F_2, \ldots,$ and $F_K$. $F_{AVE,K}$ which may be computed by any numerically equivalent algorithm such as $(F_1+F_2+ \ldots +F_K)/K$ or by executing the following recursive set of equations:

$$F_{AVE,K}=F_1 \text{ (for } K=1);$$

$$F_{AVE,K}=((K-1)*F_{AVE,K-1}+F_K)/K \text{ (for } K>1).$$

Step 65 determines whether a specified sampling termination condition is satisfied. If step 65 determines that a specified sampling termination condition is satisfied, then the sampling process ends and the average work function per pixel $w_{ave}(m)$ for initial segment m returned by the algorithm of FIG. 6 is equal to $F_{AVE,K}$. If step 65 determines that a specified sampling termination condition is not satisfied, then step 66 increments K by 1 and the sampling process loops back to step 62 to select the next pixel randomly and then execute steps 62-65. In one embodiment, the sampling may be terminated to prevent K from exceeding a specified maximum number of sampled pixels ($K_{max}$); i.e., sampling is terminated in step 65 if $K=K_{max}$.

Any reliable sampling termination condition may be employed.

In one embodiment, the sampling termination condition is satisfied if a running average variability (V) of a running average of the computed average work function per pixel for a specified window size (L) is less than a specified stopping threshold ($S_{th}$), wherein the running average variability V for the specified window size L is determined by executing a moving window algorithm.

The moving window algorithm is defined in accordance with the following description of this algorithm. The moving window algorithm utilizes the specified window size L, which is equal to the number of most recently computed running averages of the average work function per pixel. The average variability V is the difference between the normalized maximum and minimum of the moving window average values which are the L last consecutive running averages of the average work function per pixel. The variability V for the specified window size of L (wherein $L \geq 2$) is defined as $V=(F_{MAXAVE}-F_{MINAVE})/(F_{MAXAVE})$, wherein $F_{MAXAVE}$ is the maximum average of $F_{AVE,K}, F_{AVE,K-1}, \ldots, F_{AVE,K-L+1}$, and $F_{MINAVE}$ is the minimum average of $F_{AVE,K}, F_{AVE,K-1}, \ldots, F_{AVE,K-L+1}$, wherein $F_{AVE,K}$ has been defined supra. The random sampling is terminated when the variability V of the running averages is less than the specified stopping threshold $S_{th}$. This completes the definition of the moving window algorithm.

For example, consider a case of the window size L=6 and the stopping threshold being 0.01. Assume K=210 and the last 6 running averages are 10, 40, 90, 90, 89, 88 (i.e., $F_{AVE,210}=10$, $F_{AVE,209}=40$, $F_{AVE,208}=90$, $F_{AVE,207}=90$, $F_{AVE,206}=89$, $F_{AVE,205}=88$). Then $F_{MINAVE}=10$, $F_{MAXAVE}=90$, and the variability V is (90−10)/(90)=0.889 which exceeds the stopping threshold of 0.01.

If after continued sampling at K=225, the last 6 running averages are 90, 90, 89, 88, 90, 90, then $F_{MINAVE}=88$, $F_{MAXAVE}=90$, and the variability V is (90−88)/(90)=0.006 which is less than the stopping threshold of 0.01, resulting in stopping sampling in step 65 with the current sample size of 225 with an associated average work function per pixel of $F_{225}=90$. Thus, $w_{ave}(m)=90$ for segment m of this example is returned by the algorithm of FIG. 6.

In one embodiment, moving window variability is measured only after a number of warm up points (e.g., the number of pixels in the transient region 51 in FIG. 5) have elapsed.

In one embodiment, the sampling termination condition may be based on a standard error (SE) of $F_{AVE,K}$ calculated via $\sigma/K^{1/2}$, wherein $\sigma$ is the standard deviation of $F_{AVE,K}$. Then, the terminating condition is $SE(F_{AVE,K})/F_{AVE,K} < \epsilon$ where $\epsilon$ is a specified threshold.

Thus, the size of the sample is determined by continuously adding pixels to the sample until a specified sampling termination condition is satisfied or until a specified maximum number of pixels ($K_{MAX}$) has been randomly selected in the initial segment.

Figure 7:
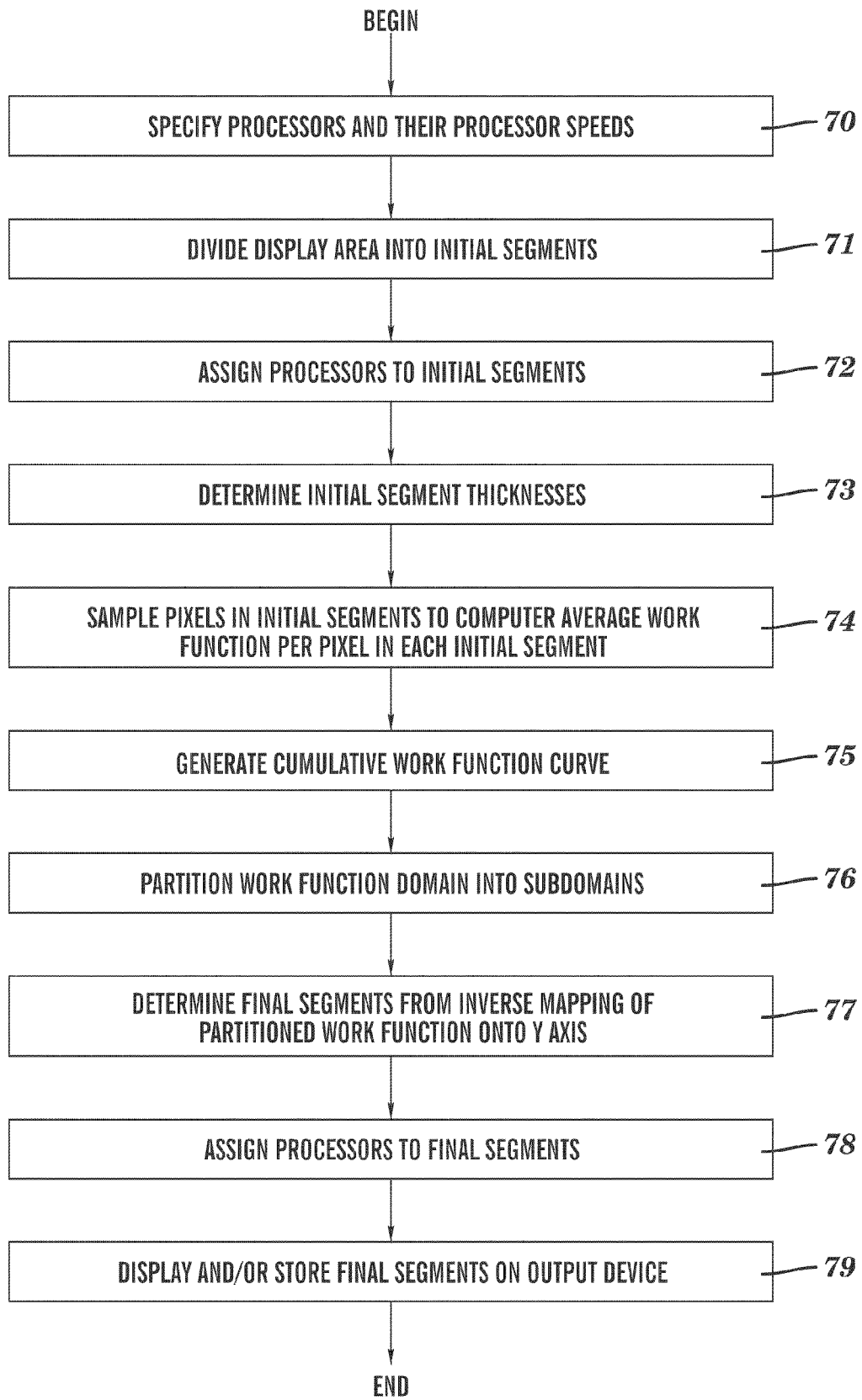
FIG. 7 is a flow chart describing a method for load balancing the work of multiple processors configured to concurrently generate an image in the display area of the display device of FIG. 1, in accordance with embodiments of the present invention.

FIG. 7 is a flow chart describing a method for load balancing the work of multiple processors configured to concurrently generate an image in the display area of a display device 10 of FIG. 1, in accordance with embodiments of the present invention. The flow chart of FIG. 7 comprises steps 70-79.

Step 70 specifies the NP processors (P(1), ..., P(NP)) used to generate the image. The corresponding processor speeds are S(1), ..., S(NP), wherein NP is at least 3.

Step 71 divides the display area 10 logically into NP initial segments, by specifying the existence of the NP initial segments, in preparation for random sampling of pixels in each initial segment in step 74. The NP initial segments are not physically determined yet, because their thicknesses have not yet been determined.

Step 72 assigns the NP processors to the NP initial segments (i.e., processor P(m) is assigned to segment m for m=1, 2, ..., NP). Each processor will process only the initial segment to which each processor is assigned and no other initial segment in the random sampling in step 74. In one embodiment, the assignment of the processors to the initial segments may be random. In one embodiment, the assignment of the processors to the initial segments may be systematic (i.e., specific processors may be assigned to specific segments).

Step 73 determines the thickness T(m) for each initial segment m for m=1, 2, ..., NP as described supra (e.g., the thickness T(m) for each initial segment m may be inversely proportional to the processor speed S(m) for initial segment m). The determined thickness T(m) is assigned to each initial segment m for m=1, 2, ..., NP.

Step 74 samples pixels simultaneously in the initial segments to compute the average work function per pixel in each initial segment as discussed supra in conjunction with FIG. 6.

Step 75 generates a cumulative work function curve by integrating the average work function per pixel in each initial segment determined in step 75 as follows:

$W(Y_0)=0$ $W(Y_1)=NPIX(1)*w_{ave}(1)$ $W(Y_m)=W(Y_{m-1})+NPIX(m)*w_{ave}(m)$ for $m=2, \ldots, NP$ wherein NPIX(m) is the total number of pixels in initial segment m and is equal to NX*T(m) (or NY*T(m) if the initial segments are ordered in the X direction), wherein $Y_m$ (m=1, 2, ..., NP) denotes the highest pixel number on the Y axis of initial segment m and $Y_0$ denotes the lowest pixel number on the Y axis of initial segment 1. Thus $Y_0, Y_1, \ldots, Y_{NS}$ are the segment boundaries of NP segments along the Y axis. $W(Y_m)$ denotes the estimated work function at $Y=Y_m$ for m=0, 1, ..., NP as derived from $w_{ave}(m)$ in the preceding equations. The work function W(Y) for $Y \neq Y_m$ (m=0, 1, ..., NP) in the range for $0<Y<Y_{NP}$ is determined by any curve fitting technique known to a person of ordinary skill in the art.

Figure 8:
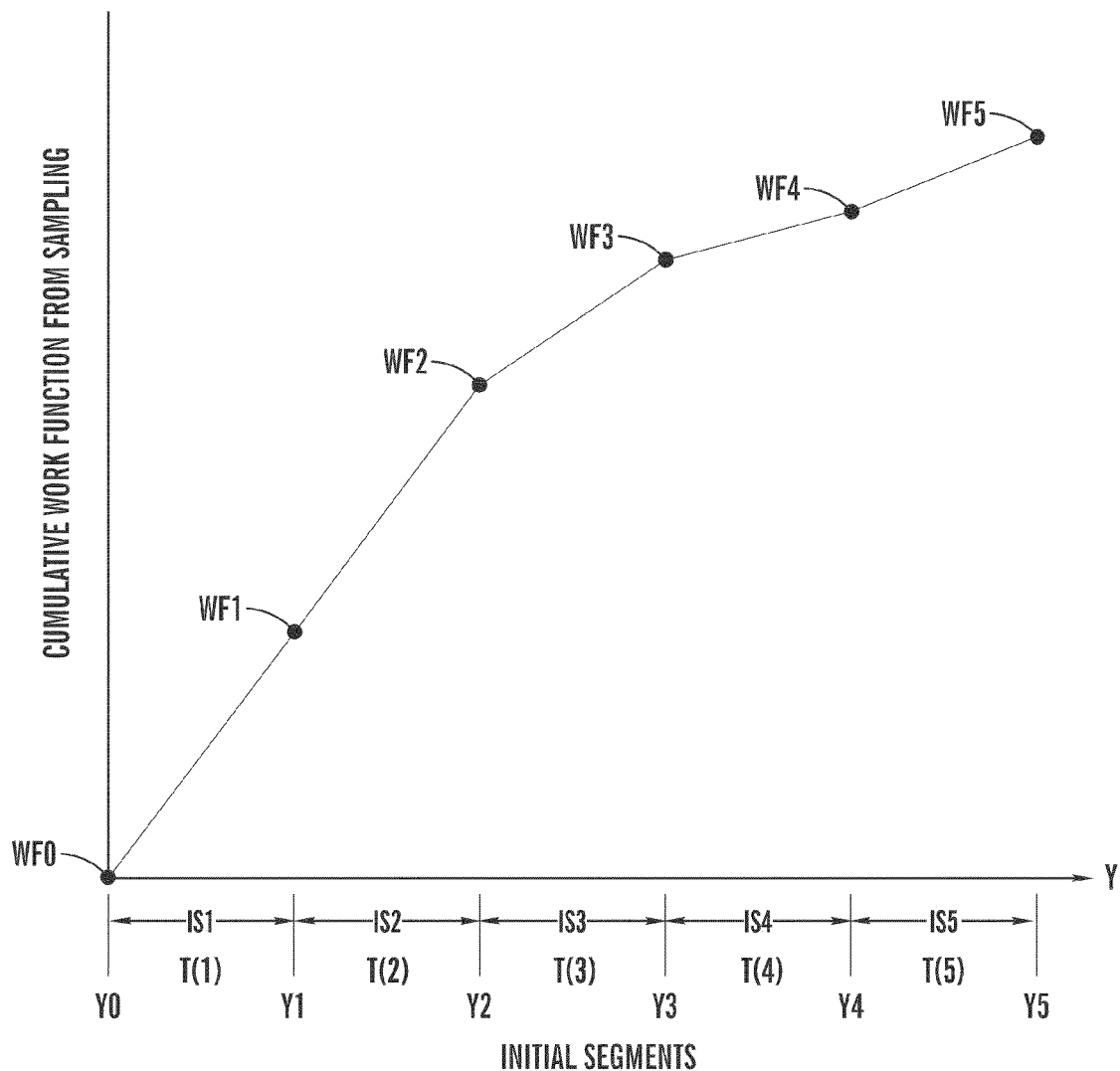
FIG. 8 is a plot of a first illustrative cumulative work function curve generated in accordance with a cumulative work function curve generation step of FIG. 7, in accordance with embodiments of the present invention.
Figure 10:
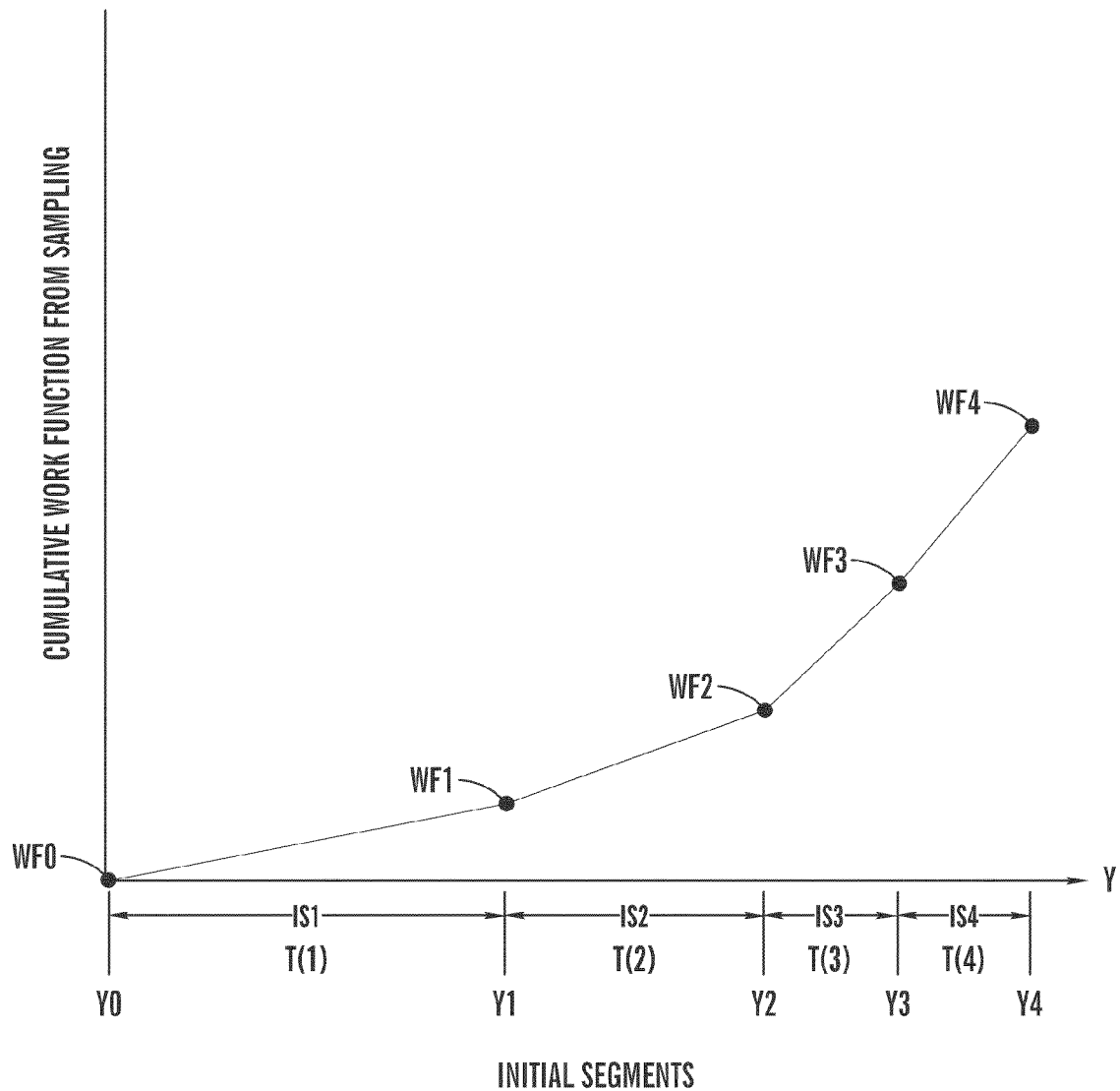
FIG. 10 is a plot of a second illustrative cumulative work function curve generated in accordance with a cumulative work function curve generation step of FIG. 7, in accordance with embodiments of the present invention.

In one embodiment, the work functions W(Y) for values of Y in the range $Y_m<y<Y_{m+1}$ are linearly fitted to $W(Y_m)$ and $W(Y_{m+1})$ via linear interpolation, for m=0, 1, ..., NP−1, as illustrated in FIGS. 8 and 10 (described infra).

In one embodiment, the work functions W(Y) for $Y \neq Y_m$ are fitted non-linearly fitted to $W(Y_0), W(Y_1), \ldots,$ and $W(Y_{NP})$ by any non-linear fitting technique known to a person of ordinary skill in the art, such as by polynomial interpolation, exponential fitting, etc.

FIG. 8 is a plot of a first illustrative cumulative work function curve generated in accordance with step 75 of FIG. 7, in accordance with embodiments of the present invention. The processors P(1), P(2), P(3), P(4), P(5) assigned to 5 initial segments IS1, IS2, IS3, IS4, IS5 have a same processing speed S(1)=S(2)=S(3)=S(4)=S(5), respectively. The thicknesses T(1), T(2), T(3), T(4), T(5) of the 5 initial segments IS1, IS2, IS3, IS4, IS5, respectively, are about constant (i.e., about equal to each other). The cumulative work functions $WF_0, WF_1, WF_2, WF_3, WF_4, WF_5$ at segment boundaries $Y_0, Y_1, Y_2, Y_3, Y_4, Y_5$, respectively, was obtained by integrating the average work function per pixel in each initial segment as described supra with respect to step 75 of FIG. 7. The full plotted curve of cumulative work function versus Y in FIG. 8 was generated by linearly connecting the successive values of $WF_0, WF_1, WF_2, WF_3, WF_4, WF_5$ as shown.

FIG. 10 is a plot of a second illustrative cumulative work function curve generated in accordance with step 75 of FIG. 7, in accordance with embodiments of the present invention. The processors P(1), P(2), P(3), P(4) assigned to 4 initial segments IS1, IS2, IS3, IS4 have relative processing speeds S(1), S(2), S(3), S(4) of 2, 3, 6, 6, respectively. The thicknesses T(1), T(2), T(3), T(4) of the 4 initial segments IS1, IS2, IS3, IS4 are inversely proportional to S(1), S(2), S(3), S(4), respectively. Therefore, T(1), T(2), T(3), T(4) have relative segment thickness values of 3, 2, 1, 1, respectively. The cumulative work functions $WF_0, WF_1, WF_2, WF_3, WF_4$ at segment boundaries $Y_0, Y_1, Y_2, Y_3, Y_4$, respectively, was obtained by integrating the average work function per pixel in each initial segment as described supra with respect to step 75 of FIG. 7. The full plotted curve of cumulative work function versus Y in FIG. 6 was generated by linearly connecting the successive values of $WF_0, WF_1, WF_2, WF_3, WF_4$ as shown.

Returning to FIG. 7, step 76 partitions the work function domain, of the cumulative work function curve generated in step 75, into sub-domains.

In one embodiment, processor speed is constant over the processors (i.e., S(m) is a same processor speed for m=1, 2, ..., NP) and the sub-domains have a same sub-domain work function interval of $\Delta W = (W(Y_{NP}) - W(Y_0))/NS$.

In one embodiment, processor speed is variable over the processors (i.e., at least two processors have a different processor speed) and the sub-domains have sub-domain work function interval of $\Delta W(m)$ inversely proportional to the processor speed S(m) for the processor in segment m.

Step 77 determines final segments for subsequent use in generating the image in the display area 10. The total number of final segments is equal to total number of initial segments. The thickness of the final segments, as determined in accordance with step 77, may differ from the thickness of the initial segments. Step 77 determines the final segments from inversely mapping the partitioned work function from step 76 onto the Y axis. In particular, the boundaries between successive sub-domains are inversely mapped by the cumulative work function onto the Y axis to form the boundaries of the final segments.

Step 78 assigns the processors to the final segments such that the processors are in a same ordering along the Y axis as were the processors assigned to the initial segments.

Figure 9:
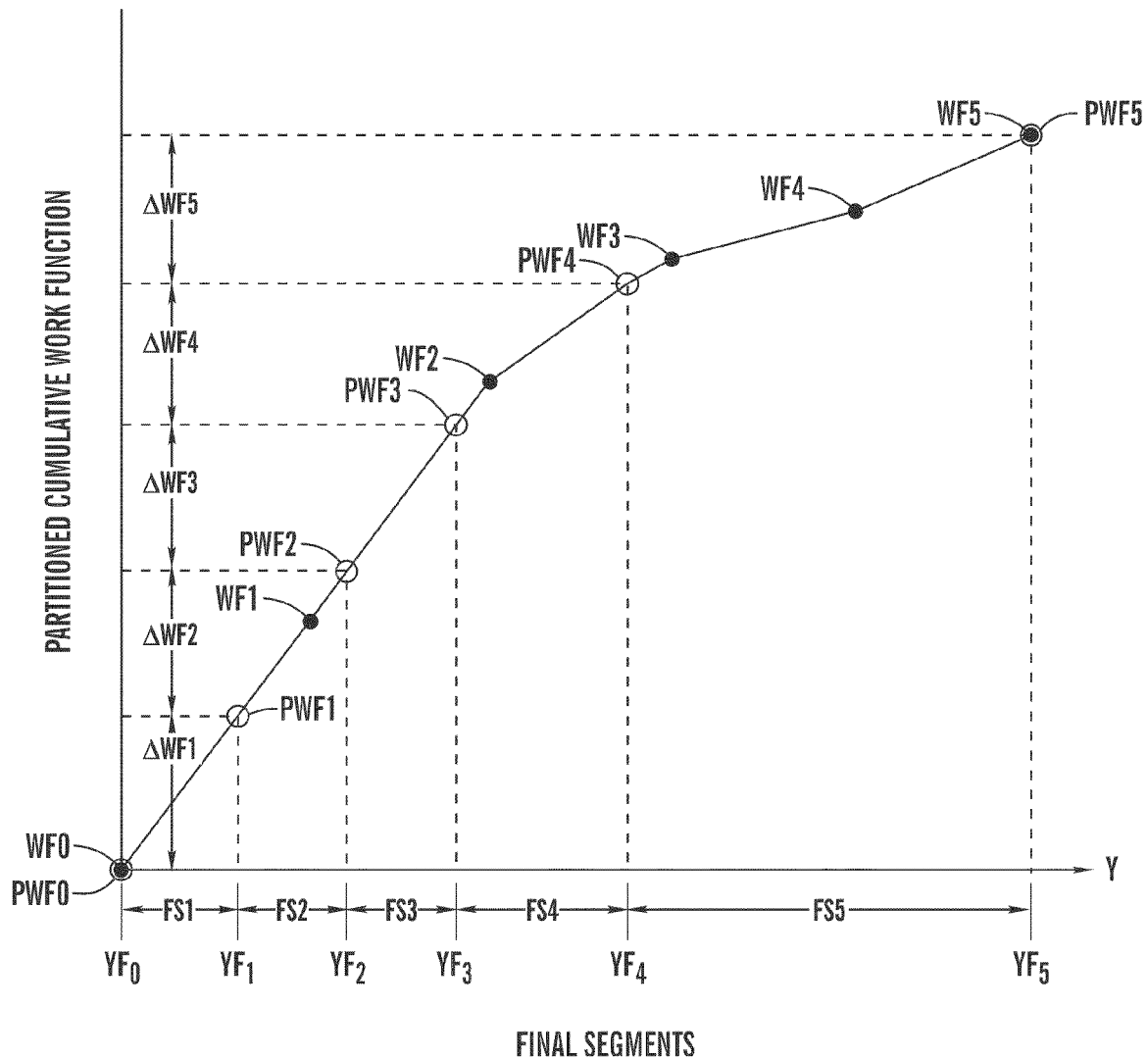
FIG. 9 is a plot of the first illustrative cumulative work function curve of FIG. 8 being partitioned and inversely mapped onto the Y axis in accordance with steps of FIG. 7 to determine final segments, in accordance with embodiments of the present invention

FIG. 9 is a plot of the first illustrative cumulative work function curve of FIG. 8 being partitioned and inversely mapped onto the Y axis in accordance with steps 76-78 of FIG. 7 to determine final segments, in accordance with embodiments of the present invention. In step 76 of FIG. 7, the domain of the cumulative work function is partitioned into a same sub-domain work function interval of $\Delta FW1 = \Delta FW2 = \Delta FW3 = \Delta FW4 = \Delta FW5 = (WF5-WF0)/5$. In step 77 of FIG. 7, the sub-domain boundaries PFW0, PFW1, PFW2, PFW3, PFW4, PFW5 are inversely mapped by the cumulative work function onto the Y axis to form the boundaries $YF_0, YF_1, YF_2, YF_3, YF_4, YF_5$ of the final segments FS1, FS2, FS3, FS4, FS5, respectively. In step 78 of FIG. 7, the processors P(1), P(2), P(3), P(4), P(5) are assigned to the final segments FS1, FS2, FS3, FS4, FS5, respectively, in a same ordering along the Y axis as were the processors P(1), P(2), P(3), P(4), P(5) assigned to the initial segments IS1, IS2, IS3, IS4, IS5, respectively.

Figure 11:
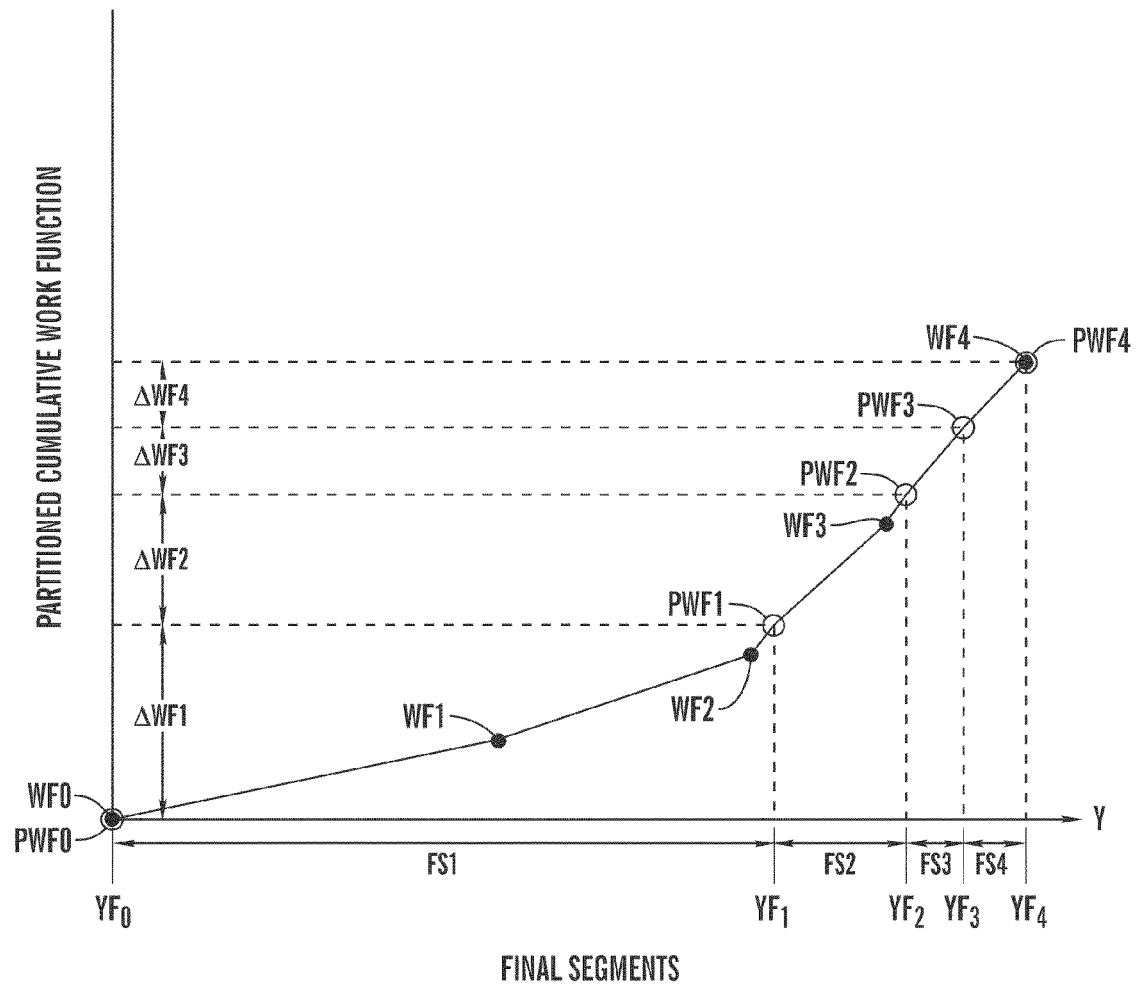
FIG. 11 is a plot of the second illustrative cumulative work function curve of FIG. 10 being partitioned and inversely mapped onto the Y axis in accordance with steps of FIG. 7 to determine final segments, in accordance with embodiments of the present invention.

FIG. 11 is a plot of the second illustrative cumulative work function curve of FIG. 10 being partitioned and inversely mapped onto the Y axis in accordance with steps 76-78 of FIG. 7 to determine final segments, in accordance with embodiments of the present invention. In step 76 of FIG. 7, the domain of the cumulative work function is partitioned into sub-domain work function intervals ΔFW1, ΔFW2, ΔFW3, ΔFW4 having relative values 3, 2, 1, 1 derived from the inverse proportionality of the sub-domain work function interval to the processor speed of 2, 3, 6, 6. In step 77 of FIG. 7, the sub-domain boundaries PFW0, PFW1, PFW2, PFW3, PFW4 are inversely mapped by the cumulative work function onto the Y axis to form the boundaries $YF_0$, $YF_1$, $YF_2$, $YF_3$, $YF_4$, of the final segments FS1, FS2, FS3, FS4, respectively. In step 78 of FIG. 7, the processors P(1), P(2), P(3), P(4) are assigned to the final segments FS1, FS2, FS3, FS4, respectively, in a same ordering along the Y axis as were the processors P(1), P(2), P(3), P(4) assigned to the initial segments IS1, IS2, IS3, IS4, respectively.

Figure 13:
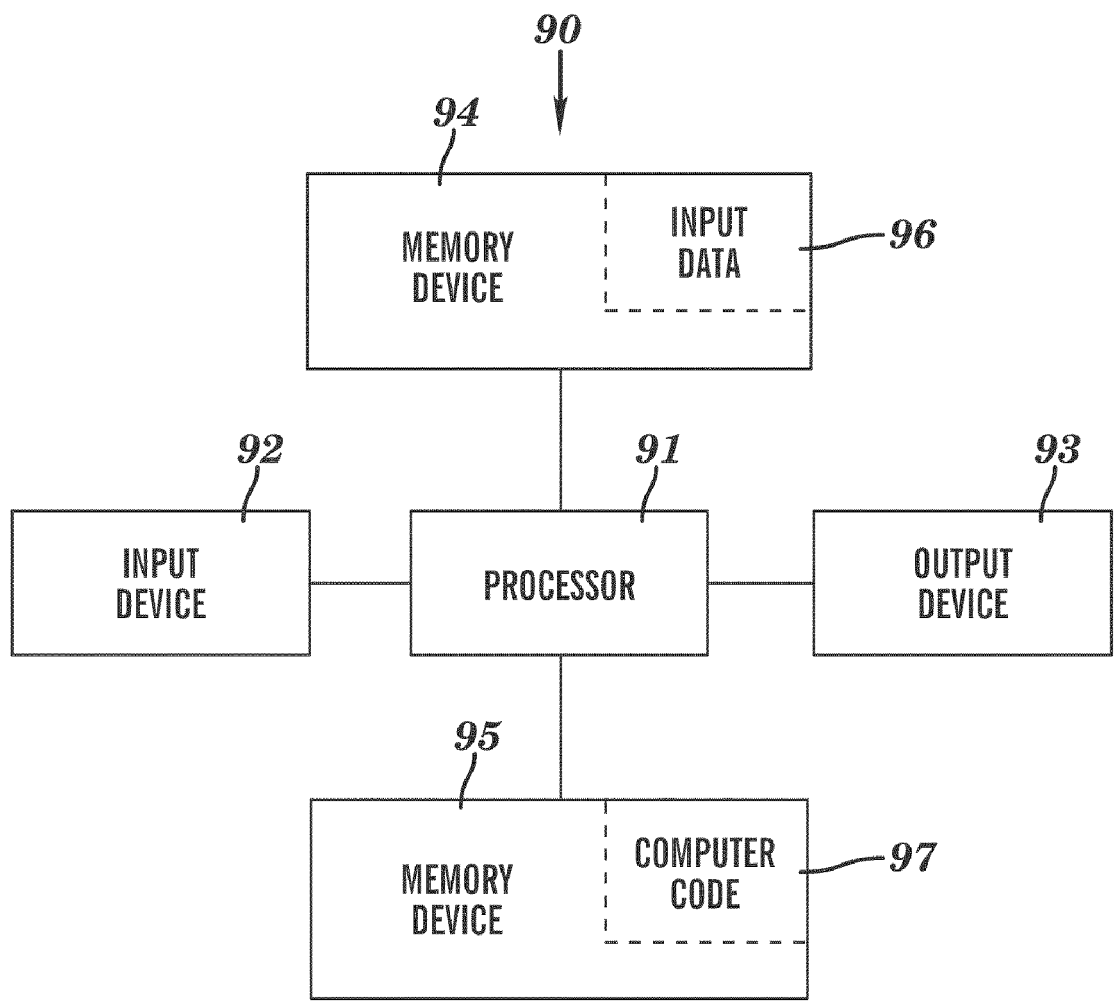
FIG. 13 illustrates a computer system used for load balancing the work of multiple processors configured to concurrently generate one or more images in the display area of a display device, in accordance with embodiments of the present invention.

Returning to FIG. 7, step 79 displays and/or stores the NP final segments on an output device (e.g., on an output device of a computer system such as the computer system 90 of FIG. 13 or on any storage device).

Table 1 and 2 show the effect of load balancing of a 'fractal generation' application (Adrien Douady and John H. Hubbard, Etude dynamique des polynomes complexes, Prepublication mathematiques d'Orsay 2/4 (1984/1985)).

TABLE 1

Fractal Generation Load-Balancing Results for 16 SPUs

|  | No load-balancing | Using load-balancing |
|---|---|---|
| Sampling overhead | n/a | 0.29 sec |
| Parallel section execution time | 14.33 sec | 5.87 sec |
| Total Execution Time | 14.33 sec | 6.16 sec |
| Speedup (relative to no load balance) | 1 | 2.33 |
| Percentage achieved of perfect load-balance | 38% | 94% |

TABLE 2

Fractal Generation Load-Balancing Results for 8 SPUs

|  | No load-balancing | Using load-balancing |
|---|---|---|
| Sampling overhead | n/a | 0.27 sec |
| Parallel section execution time | 25.88 sec | 12.19 sec |
| Total Execution Time | 25.88 sec | 12.46 sec |
| Speedup (relative to no load balance) | 1 | 2.08 |
| Percentage achieved of perfect load-balance | 42% | 89% |

The image described in Tables 1 and 2 was processed using multi-core processor system (a Cell BE Blade—IBM. Cell Broadband Engine Architecture, October 2006. Version 1.01) using 8 and 16 SPUs, once with no load-balancing (dividing the image evenly on SPUs) and once with load-balancing (using the invented method). The parameters "Percentage achieved of perfect load-balancing" is computed as a percent from the fraction of (average w)/(max {$w_i$}), wherein (average w) is the average execution time of all of the SPUs, and w1 is the total execution time taken by SPU i.

Tables 1 and 2 indicate that the sampling overhead (i.e., the additional processing overhead of random sampling and associated processing prior to generating the image in the display area) is substantially less than a reduction in processing time resulting from the load balancing as compared with generating the image without the load balancing. The reduction in processing is the difference in "parallel section execution time" between "no load-balancing" and "using load-balancing".

Tables 1 and 2 indicate that the time for generating the image is reduced by more than a factor of 2, achieving about 90% of the perfect load balancing (89% with 8 SPUs and 94% with 16 SPUs).

In one embodiment, the present invention is applicable to load balancing for image processing a set of uncorrelated images, wherein the image processing for each image of the set of uncorrelated images is implemented as discussed supra in relation to FIGS. 1-11 and accompanying discussion thereof.

Figure 12:
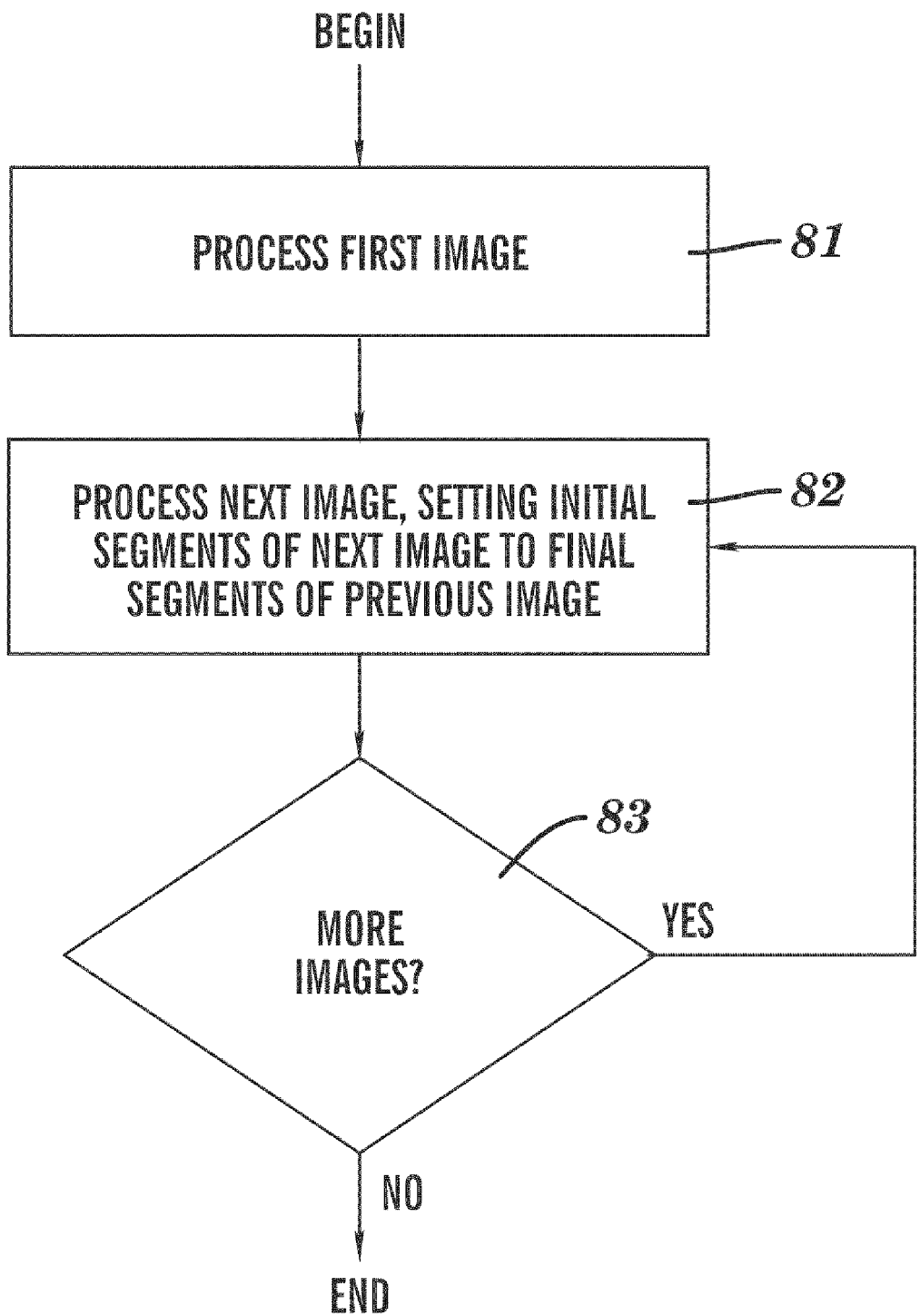
FIG. 12 is a flow chart of an algorithm describing load balancing the work of multiple processors configured to concurrently generate a sequence of correlated images in the display area of the display device of FIG. 1, in accordance with embodiments of the present invention.

In one embodiment, the present invention is applicable to load balancing for image processing a set of correlated images in frames such as, inter alia, the successive images of a video stream as described infra in conjunction with FIG. 12. For each image after the first image, the load balancing may have increased efficiency by utilizing the load balancing results from the previous frames that have been load balanced.

FIG. 12 is a flow chart of an algorithm describing load balancing the work of multiple processors configured to concurrently generate a sequence of correlated images in the display area of the display device of FIG. 1, in accordance with embodiments of the present invention. The flow chart of FIG. 12 comprises steps 81-83.

Step 81 load balances the work of multiple processors to process the first image of the sequence of correlated images according to the methodology described supra for FIGS. 1-11 and accompanying discussion thereof.

Step 82 load balances the work of the processors to process the next image in the sequence according to the methodology described supra, setting the initial segments of the next image equal to the final segments of the previous image.

Step 83 determines whether there are one or more images in the sequence to load balance for image processing. If step 83 determines that there are no images in the sequence to load balance for image processing, then the algorithm ends. If step 83 determines that there are one or more images in the sequence to load balance for image processing, then the algorithm loops back to step 82 to load balance for image processing the next image in the sequence.

The algorithm of FIG. 12 makes use of the fact that two consecutive frames are not likely to differ considerably. At a scene changes image where there is a scene change, there may be a significant change in the image and the algorithm of FIG. 12 may not be efficient for such a scene change image. However, the algorithm of FIG. 12 will regain its efficiency for the images immediately following the scene change image.

Thus, the method of the present invention generates N images in a display area of a display device. The display area comprising NX×NY pixels that consists of NX columns of pixels in an X direction and NY rows of pixels in a Y direction that is orthogonal to the X direction, wherein N≧1, NP≧3, NX≧3, and NY≧3. The N images are denoted as $I_1, I_2, \ldots, I_N$. The method comprises performing a process for each image $I_n$ (n=1, 2, . . . , N). The process for image $I_n$ is performed according to the methodology described supra for FIGS. 1-11 and accompanying discussion thereof.

In one embodiment, $N \geq 2$ and the N images are uncorrelated with each other. The process for the N images may be performed sequentially or concurrently. Thus, the present invention is applicable to load balancing for image processing a set of uncorrelated images.

In one embodiment, $N \geq 2$ and at least two successive images of the N images are correlated with each other (e.g., images in a video stream). Consider the image $I_{m+1}$ being correlated with the image $I_m$ such that m is a positive integer satisfying $1 \leq m \leq N-1$. The process for the N images are performed sequentially in an ordered image sequence of: the process for image $I_1$, the process for image $I_2$, ..., the process for image $I_N$. Said determining the thickness of each initial segment in the process for image $I_{m+1}$ comprises setting the thickness of each initial segment for image $I_{m+1}$ equal to the thickness of the corresponding final segment for image $I_m$. This embodiment is in accordance with FIG. 12 described supra. Thus, the present invention is applicable to load balancing for image processing a set of correlated images such as in a sequence of images in a video stream.

The present invention is appropriate for distribution of finer grain work to processors, which may be attractive to multi-core processors, since on chip architectures allow for efficiently running fine grain threads.

The present invention is applicable to a vast class of applications such as advanced high dynamic range (HDR) imaging and fractal applications.

FIG. 13 illustrates a computer system 90 used for load balancing the work of multiple processors configured to concurrently generate one or more images in the display area of a display device, in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 is a processing unit such as a central processing unit (CPU). The input device 92 may be, inter alia, a keyboard, a mouse, etc. The output device 93 may be, inter alia, a printer, a plotter, a display device (e.g., a computer screen), a magnetic tape, a removable hard disk, a floppy disk, etc. The display device may comprise the display area 10 of FIG. 1. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for load balancing the work of multiple processors configured to concurrently generate one or more images in the display area of a display device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for load balancing the work of NP processors (NP$\geq$3) configured to generate each image of N images (N$\geq$1) in a display area of a display device, said method comprising performing a process for each image, said process for each image comprising:

dividing the display area into NP initial segments ordered along an axis of the display area;
   assigning each processor to a corresponding initial segment, each processor configured to generate a portion of each image only in the initial segment to which each processor is assigned;
   assigning a thickness to each initial segment;
   simultaneously computing an average work function per pixel for each initial segment;
   generating a cumulative work function by cumulatively integrating the average work function per pixel over the initial segments;
   partitioning a work function domain of the cumulative work function into NP sub-domains;
   determining NP final segments of the display area by using the cumulative work function to inversely map boundaries of the sub-domains onto the axis;
   assigning each processor to a final segment such that the processors are in a same ordering along the axis as were the processors assigned to the initial segments, and
   displaying and/or storing the NP final segments.

2. The method of claim 1, wherein each processor speed has a same processor speed, wherein the assigned thickness of each initial segment is substantially a same thickness, and wherein said partitioning comprises partitioning the work function domain of the cumulative work function into sub-domains having a same sub-domain work function interval.

3. The method of claim 1, wherein at least two processors of the NP processors have a different processor speed, wherein the assigned thickness of each initial segment is substantially inversely proportional to the processor speed of the processor assigned to each initial segment, and wherein said partitioning comprises partitioning the work function domain of the cumulative work function into sub-domains such that each sub-domain has a work function interval that is inversely proportional to the processor speed of the processor assigned to the initial segment to which each work function domain corresponds.

4. The method of claim 1, wherein said simultaneously computing comprises simultaneously computing the average work function per pixel for each initial segment by randomly sampling pixels in the NP initial segments until determining that a specified sampling termination condition has been satisfied in each initial segment, using the NP processors concurrently such that each processor generates the portion of the image only in the initial segment to which each processor is assigned.

5. The method of claim 4, wherein said determining that the specified sampling termination condition has been satisfied in each initial segment comprises determining, via executing a moving window algorithm for each initial segment, that a variability V of a running average of the computed average work function per pixel for a specified window size L is less than a specified stopping threshold ($S_{th}$).

6. The method of claim 4, wherein said determining that the specified sampling termination condition has been satisfied in each initial segment comprises determining for each initial segment that a ratio of a standard error of the computed average work function per pixel to the computed average work function per pixel is less than a specified threshold in each initial segment, and wherein the standard error of the computed average work function per pixel is a ratio of the standard deviation of the computed average work function per pixel to a square root of a total number of pixels sampled.

7. The method of claim 1, wherein said generating the cumulative work function comprises generating the cumulative work function (W) as a function of a position Y along the axis, wherein the initial segments are defined by NP+1 boundary values ($Y_0, Y_1, \ldots Y_{NP}$) at the boundaries of the initial segments along the axis, wherein said generating W as a function of Y comprises computing W for the NP+1 boundary values followed by determining the work function W(Y) at $Y \neq Y_m$ (m=0, 1, ..., NP) in the range for $0<Y<Y_{NP}$ via curve fitting W(Y) to the NP+1 boundary values, said computing W for the NP+1 boundary values comprising:
  setting $W(Y_0)=0$;
  computing $W(Y_1)=NPIX(1)*w_{ave}(1)$; and
  computing $W(Y_m)=W(Y_{m-1})+NPIX(m)*w_{ave}(m)$ for m=2, ..., NP, wherein $w_{ave}(m)$ is the average work function per pixel in initial segment m and NPIX(m) is a total number of pixels in initial segment m.

8. The method of claim 1, wherein $N \geq 2$ and the N images are uncorrelated with each other.

9. The method of claim 1, wherein $N \geq 2$, wherein the N images are denoted as $I_1, I_2, \ldots, I_N$, wherein the image $I_{m+1}$ is correlated with the image $I_m$ such that m is a positive integer satisfying $1 \leq m \leq N-1$, wherein the process for the N images are performed in an ordered sequence of the process for the image $I_1$, the process for the image $I_2, \ldots$, the process for the image $I_N$, and wherein said determining the thickness of each initial segment in the process for the image $I_{m+1}$ comprises setting the thickness of each initial segment for the image $I_{m+1}$ equal to the thickness of the corresponding final segment for the image $I_m$.

10. A computer program product, comprising a computer storage device having a computer readable program code stored therein, said computer readable program code containing instructions that when executed by a processing unit of a computer system implement a method for load balancing the work of NP processors ($N \geq 3$) configured to generate each image of N images ($N \geq 1$) in a display area of a display device, said method comprising performing a process for each image, said process for each image comprising:
  dividing the display area into NP initial segments ordered along an axis of the display area;
  assigning each processor to a corresponding initial segment, each processor configured to generate a portion of each image only in the initial segment to which each processor is assigned;
  assigning a thickness to each initial segment;
  simultaneously computing an average work function per pixel for each initial segment;
  generating a cumulative work function by cumulatively integrating the average work function per pixel over the initial segments;
  partitioning a work function domain of the cumulative work function into NP sub-domains;
  determining NP final segments of the display area by using the cumulative work function to inversely map boundaries of the sub-domains onto the axis;
  assigning each processor to a final segment such that the processors are in a same ordering along the axis as were the processors assigned to the initial segments, and
  displaying and/or storing the NP final segments.

11. The computer program product of claim 10, wherein each processor speed has a same processor speed, wherein assigned thickness of each initial segment is substantially a same thickness, and wherein said partitioning comprises partitioning the work function domain of the cumulative work function into sub-domains having a same sub-domain work function interval.

12. The computer program product of claim 10, wherein at least two processors of the NP processors have a different processor speed, wherein the assigned thickness of each initial segment is substantially inversely proportional to the processor speed of the processor assigned to each initial segment, and wherein said partitioning comprises partitioning the work function domain of the cumulative work function into sub-domains such that each sub-domain has a work function interval that is inversely proportional to the processor speed of the processor assigned to the initial segment to which each work function domain corresponds.

13. The computer program product of claim 10, wherein said simultaneously computing comprises simultaneously computing the average work function per pixel for each initial segment by randomly sampling pixels in the NP initial segments until determining that a specified sampling termination condition has been satisfied in each initial segment, using the NP processors concurrently such that each processor generates the portion of the image only in the initial segment to which each processor is assigned.

14. The computer program product of claim 13, wherein said determining that the specified sampling termination condition has been satisfied in each initial segment comprises determining, via executing a moving window algorithm for each initial segment, that a variability V of a running average of the computed average work function per pixel for a specified window size L is less than a specified stopping threshold ($S_{th}$).

15. The computer program product of claim 10, wherein said generating the cumulative work function comprises generating the cumulative work function (W) as a function of a position Y along the axis, wherein the initial segments are defined by NP+1 boundary values ($Y_0, Y_1, \ldots Y_{NP}$) at the boundaries of the initial segments along the axis, wherein said generating W as a function of Y comprises computing W for the NP+1 boundary values followed by determining the work function W(Y) at $Y \neq Y_m$ (m=0, 1, ..., NP) in the range for $0<Y<Y_{NP}$ via curve fitting W(Y) to the NP+1 boundary values, said computing W for the NP+1 boundary values comprising:
  setting $W(Y_0)=0$;
  computing $W(Y_1)=NPIX(1)*w_{ave}(1)$; and
  computing $W(Y_m)=W(Y_{m-1})+NPIX(m)*w_{ave}(m)$ for m=2, ..., NP, wherein $w_{ave}(m)$ is the average work function per pixel in initial segment m and NPIX(m) is a total number of pixels in initial segment m.

16. The computer program product of claim 10, wherein $N \geq 2$ and the N images are uncorrelated with each other.

17. The computer program product of claim 10, wherein $N \geq 2$, wherein the N images are denoted as $I_1, I_2, \ldots, I_N$, wherein the image $I_{m+1}$ is correlated with the image $I_m$ such that m is a positive integer satisfying $1 \leq m \leq N-1$, wherein the process for the N images are performed in an ordered sequence of the process for the image $I_1$, the process for the image $I_2, \ldots$, the process for the image $I_N$, and wherein said determining the thickness of each initial segment in the process for the mage $I_{m+1}$ comprises setting the thickness of each initial segment for the image $I_{m+1}$ equal to the thickness of the corresponding final segment for the image $I_m$.

18. A computer system comprising a processing unit and a computer readable memory unit coupled to the processing unit, said memory unit containing instructions that when executed by the processing unit implement a method for load balancing the work of NP processors ($NP \geq 3$) configured to generate each image of N images ($N \geq 1$) in a display area of a display device, said method comprising performing a process for each image, said process for each image comprising:
  dividing the display area into NP initial segments ordered along an axis of the display area;
  assigning each processor to a corresponding initial segment, each processor configured to generate a portion of each image only in the initial segment to which each processor is assigned;
  assigning a thickness to each initial segment;
  simultaneously computing an average work function per pixel for each initial segment;
  generating a cumulative work function by cumulatively integrating the average work function per pixel over the initial segments;
  partitioning a work function domain of the cumulative work function into NP sub-domains;
  determining NP final segments of the display area by using the cumulative work function to inversely map boundaries of the sub-domains onto the axis;
  assigning each processor to a final segment such that the processors are in a same ordering along the axis as were the processors assigned to the initial segments, and
  displaying and/or storing the NP final segments.

19. The computer system of claim 18, wherein each processor speed has a same processor speed, wherein the assigned thickness of each initial segment is substantially a same thickness, and wherein said partitioning comprises partitioning the work function domain of the cumulative work function into sub-domains having a same sub-domain work function interval.

20. The computer system of claim 18, wherein at least two processors of the NP processors have a different processor speed, wherein the assigned thickness of each initial segment is substantially inversely proportional to the processor speed of the processor assigned to each initial segment, and wherein said partitioning comprises partitioning the work function domain of the cumulative work function into sub-domains such that each sub-domain has a work function interval that is inversely proportional to the processor speed of the processor assigned to the initial segment to which each work function domain corresponds.

21. The computer system of claim 18, wherein said simultaneously computing comprises simultaneously computing the average work function per pixel for each initial segment by randomly sampling pixels in the NP initial segments until determining that a specified sampling termination condition has been satisfied in each initial segment, using the NP processors concurrently such that each processor generates the portion of the image only in the initial segment to which each processor is assigned.

22. The computer system of claim 21, wherein said determining that the specified sampling termination condition has been satisfied in each initial segment comprises determining, via executing a moving window algorithm for each initial segment, that a variability V of a running average of the computed average work function per pixel for a specified window size L is less than a specified stopping threshold ($S_{th}$).

23. The computer system of claim 18, wherein said generating the cumulative work function comprises generating the cumulative work function (W) as a function of a position Y along the axis, wherein the initial segments are defined by NP+1 boundary values ($Y_0, Y_1, \ldots Y_{NP}$) at the boundaries of the initial segments along the axis, wherein said generating W as a function of Y comprises computing W for the NP+1 boundary values followed by determining the work function W(Y) at $Y \neq Y_m$ (m=0, 1, \ldots, NP) in the range for $0 < Y < Y_{NP}$ via curve fitting W(Y) to the NP+1 boundary values, said computing W for the NP+1 boundary values comprising:
  setting $W(Y_0)=0$;
  computing $W(Y_1)=NPIX(1)*w_{ave}(1)$; and
  computing $W(Y_m)=W(Y_{m-1})+NPIX(m)*w_{ave}(m)$ for m=2, \ldots, NP, wherein $w_{ave}(m)$ is the average work function per pixel in initial segment m and NPIX(m) is a total number of pixels in initial segment m.

24. The computer system of claim 18, wherein $N \geq 2$ and the N images are uncorrelated with each other.

25. The computer system of claim 18, wherein $N \geq 2$, wherein the N images are denoted as $I_1, I_2, \ldots, I_N$, wherein the image $I_{m+1}$ is correlated with the image $I_m$ such that m is a positive integer satisfying $1 \leq m \leq N-1$, wherein the process for the N images are performed in an ordered sequence of the process for the image $I_1$, the process for the image $I_2, \ldots$, the process for the image $I_N$, and wherein said determining the thickness of each initial segment in the process for the image $I_{m+1}$ comprises setting the thickness of each initial segment for the image $I_{m+1}$ equal to the thickness of the corresponding final segment for the image $I_m$.

\* \* \* \* \*